Inventor
J. S. Neale

Patented Aug. 12, 1952

2,606,621

UNITED STATES PATENT OFFICE 2,606,621

HELICOPTER ROTOR CONTROL SYSTEM

John Sidney Neale, Hendon, London, England, assignor to Pennine Aircraft Limited, Manchester, England, a British company Application March 11, 1949, Serial No. 80,975
In Great Britain December 30, 1948

6 Claims. (Cl. 170—135.74)

This invention relates to helicopters, and has for its object to provide means for automatically reducing variations in lift by controlling the pitch of the rotor blades and the power input thereto.

According to the invention, a pumping system driven by the engine maintains a pressure in a hydraulic pitch control system, and means responsive to variations in lift are provided for actuating the engine controls to correct such variations.

Preferably, a restriction is provided in the conduit from the engine driven pumping system to the hydraulic pitch control system, and pressure differences developed across the restriction are utilised for actuating the engine controls.

The invention is applicable to arrangements in which the blades of the motor are coupled with a hydraulic system for obtaining cyclic changes of pitch as the rotor rotates, such hydraulic system being connected to an engine driven pump for general pitch control. A characteristic being that a pressure is developed in the system by the engine driven pump with a reaction thereto proportional to a torque developed about the pitch changing axis of individual blades engendered aerodynamically.

Referring to the accompanyning drawings.

Figure 1:
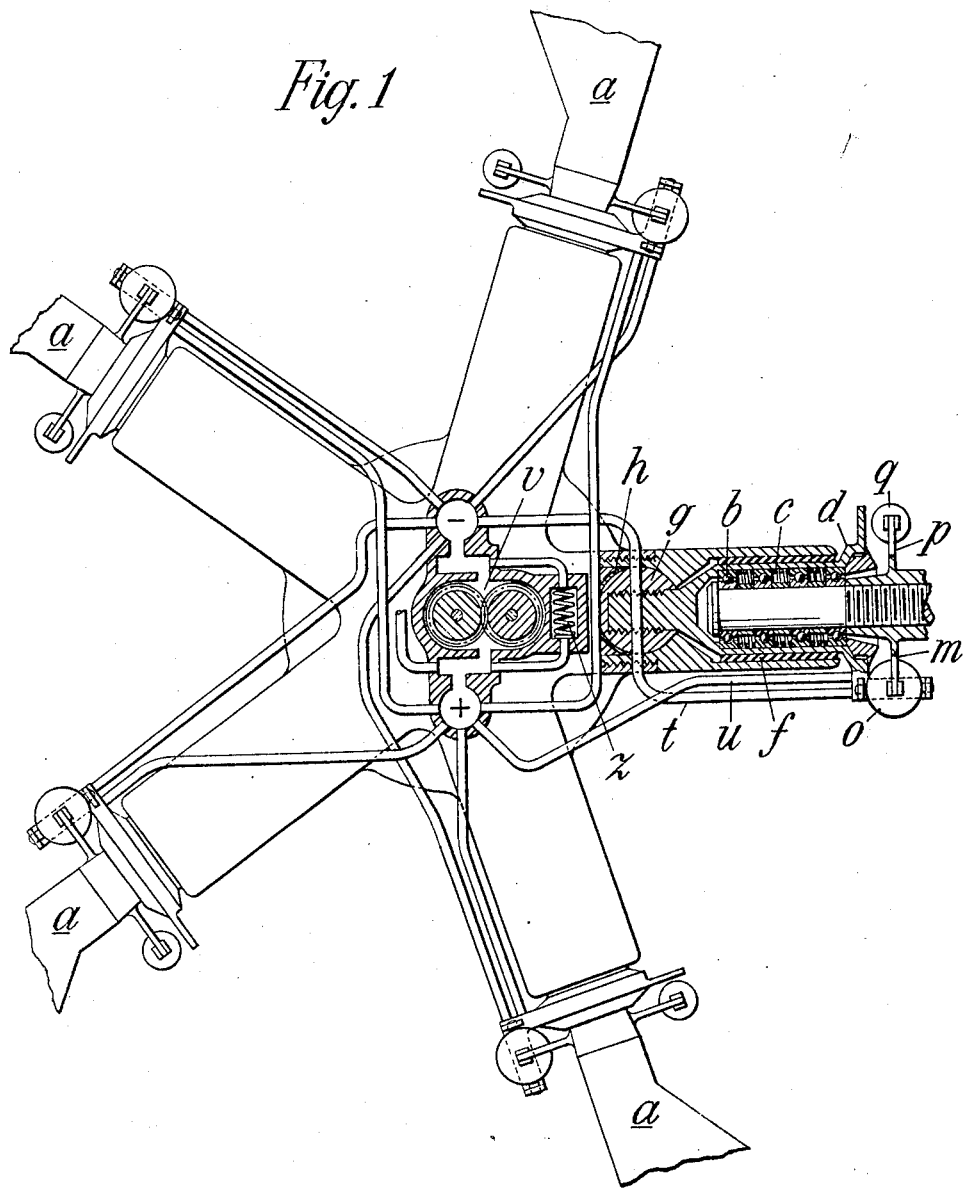
Figure 1 is a transverse section through the rotor head in a convenient arrangement in accordance with the invention.
Figure 2:
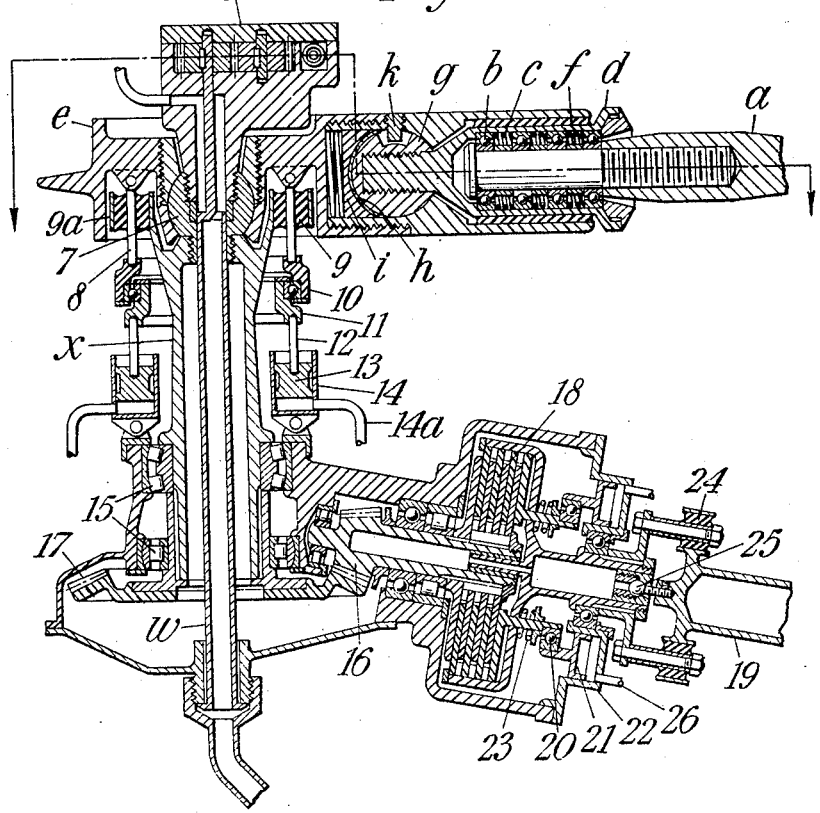
Figure 2 is a vertical section through the rotor and its driving and controlling means.

In the example illustrated, the rotor has five blades $a$. The root of each blade is mounted in double angle ball bearings $b$ separated by springs $c$ for distributing the bearing loads so that the load on any individual bearing does not exceed a predetermined amount, in a member $d$ which is supported in the rotor head $e$ by means of a stiff rubber sleeve $f$ which will allow slight changes in blade alignment to maintain the desired coning angle at various rotational speeds of the rotor. At the inner end of the member $d$ is a ball $g$ bearing through a layer $h$ of friction material against a spring-loaded concave member $i$, to damp flapping movements of the blade. A stop $k$ (Figure 2) prevents rotation of the ball $g$ about the blade axis.

Each blade is coupled by an arm $m$ to a piston $n$ moving in a cylinder $o$, and by an arm $p$ to an inertia balancing device $q$. The cylinder $o$ and device $q$ are mounted on the member $d$. Each cylinder $o$ has inlet and outlet ports, controlled by a flapper valve, and conduits $t, u$ leading to the suction and delivery sides of a gear pump $v$ mounted above the rotor head $e$, and driven by the rotation of the rotor head about a fixed tube $w$ passing through the hollow rotor shaft $x$, and serving also for supplying fluid from a pump $y$ driven by the helicopter engine 42. A differential valve $z$ connected across the pump $v$ maintains a predetermined pressure difference across the pump. With this arrangement, as the pitch of a blade tends to decrease following on an increase in lift, the piston coupled with the blade transmits a force into the hydraulic system, and as the pitch tends to increase it receives an impulse from the system, such impulses being boosted by the pump $v$. Owing to the fluid being circulated through the hub by the pump $v$, temperature and viscosity have less influence on the operation of the system and a more viscous fluid can be used, whereby difficulties in sealing are minimised, as compared with an arrangement not having the fluid circulated. The operation of a system of this type in producing cyclic pitch changes to equalise the torsional forces acting at the blade roots is described in copending applications of the same applicant Serial No. 664,509 dated April 24, 1946, and now abandoned, and Serial No. 19,473 dated April 7, 1948, now Patent No. 2,593,335.

The rotor head $e$ is formed with a spherical socket adapted to fit over a ball 7 formed at the top of the rotor shaft $x$, so that the rotor head can tilt in any direction with respect to the shaft $x$ and consequently with respect to the fuselage. The driving connection between the shaft $x$ and the rotor head is obtained by means of a number of rods 8 pivotally attached to the rotor head $e$ in a circle around its axis, which rods are embedded in rubber blocks 9 fixed in sockets 9$a$ carried by arms on the shaft $x$, so forming a universal joint of a substantiallly constant velocity type. The rods 8 pass through the rubber blocks 9 and their lower ends are attached to a ring 10. This ring 10 surrounds and rides upon a second ring 11, suitable antifriction bearings being provided, such that the ring 10 can rotate freely with respect to the non-rotating ring 11, but is not capable of axial displacement with respect thereto, so that axial movements of the ring 11 are transmitted to the ring 10. The ring 11 is connected by rods 12 to pistons 13 in cylinders 14 connected by tubes 14$a$ to a similarly arranged system in the cockpit for supplying fluid to or withdrawing it from approriate cylinders in order to tilt the ring 11 and the rotor head to control translational movements of the helicopter.

Figure 3:
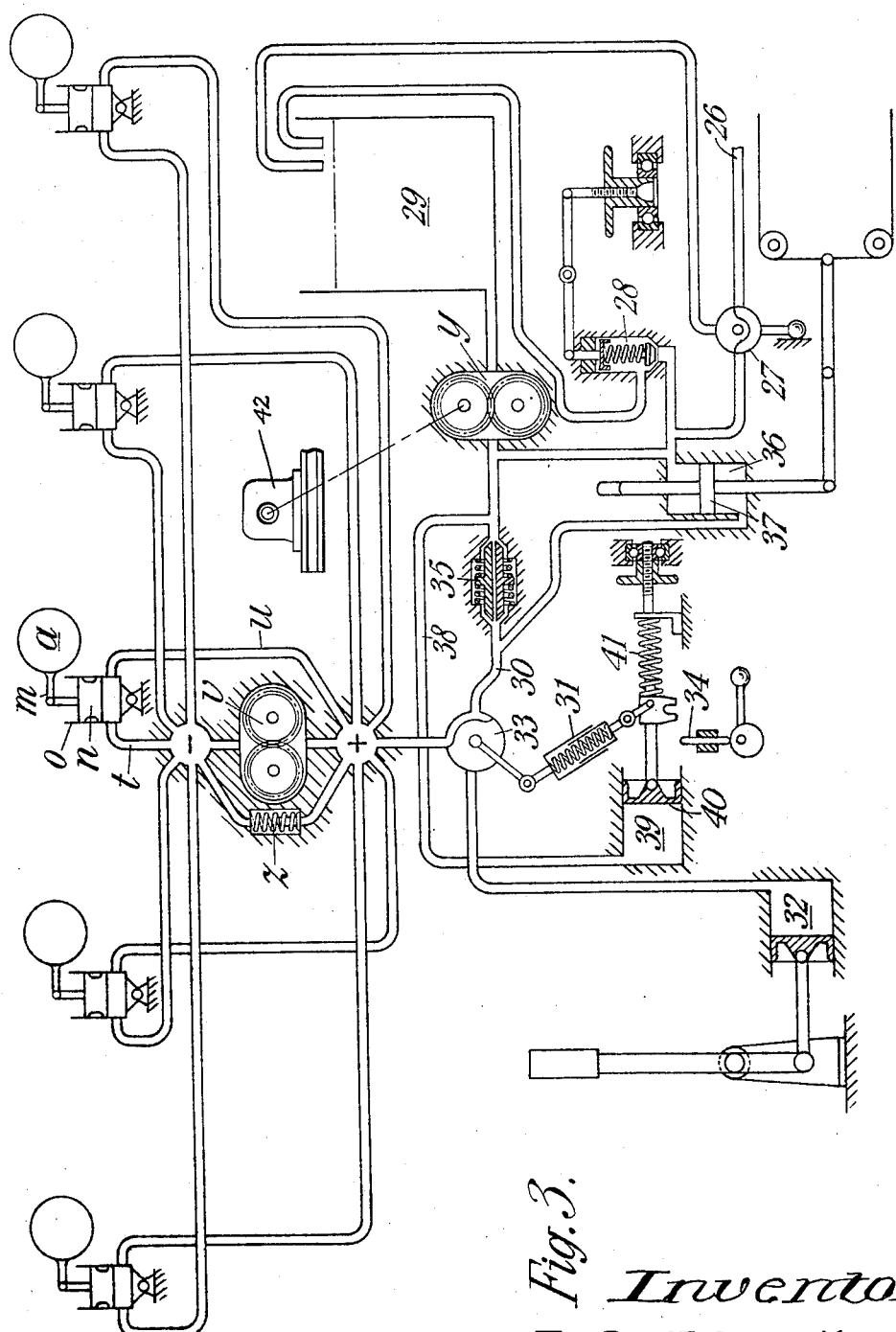
Figure 3 is a diagram of the hydraulic system.

The shaft $x$, which runs on bearings 15 in the fuselage, is driven through bevel gears 16, 17 and a disc clutch 18 from a shaft 19. The clutch 18 is engaged by application of pressure, through ball bearings 20, from pistons 21 in cylinders 22 to which fluid is provided by the engine driven pump $y$. Springs 23 release the clutch when the fluid pressure drops. The shaft 19 is coupled to the clutch driving element through rubber blocks 24, with a ball joint 25 to restrict shaft whirling. As shown in Figure 3, the pump $y$ delivers fluid to a line 26 to the clutch cylinders 22. A valve 27 enables the fluid supply to the clutch to be shut off, and the pressure released to the fluid storage tank 29.

The delivery pressure of the pump $y$ is controlled by an adjustable overflow valve 28 having an outlet to a fluid storage tank 29. The pump $y$ delivers normally through tube 30 to the rotor head pump $v$ and by varying the pump pressure by means of the valve 28 the common rotor pitch can be controlled. An adjustable snap switch 31 enables the pump $v$ to be connected to a hand pump 32 instead of the pump $y$ by means of a two way valve 33, for emergency pitch control in case of engine failure. A pin stop 34 is provided to lock the system in the emergency position.

In order to maintain the lift at a predetermined value, a restriction 35 is provided in the line from pump $y$ to pump $v$, and a cylinder 36 is connected across the restriction. When a pressure differential occurs across the restriction 35, corresponding to a variation from the desired value of lift, the piston 37 will be displaced in its cylinder and will actuate the engine throttle in the appropriate direction to correct the lift.

A tube 38 leads from the pump $y$ to a cylinder 39 having a piston 40 controlling the snap switch 31. When the pressure drops due to lack of pumping pressure, which may be caused by engine failure, absence of pressure behind piston 40 allows the spring 41 to actuate the snap switch to put the emergency pitch control in operation. Also absence of pressure in line 26 allows the clutch 18 to disengage. An overrunning clutch is located on the engine to allow the rotor to run free if the engine revolutions drop considerably.

The invention has been described by way of example with reference to a particular system of driving and controlling a helicopter rotor, but it is to be understood that the invention as defined in the appended claims is applicable also to various other systems. For example, the method of controlling the machine for translation may be varied, and a different system such as moving the fuselage or parts of it relative to the rotor head and so shifting the centre of gravity, may be used.

The pump $v$ may be omitted from the system in which case all the cylinders are connected directly to the common inlet 30.

What I claim is:

1. A helicopter having a lifting system, said system including rotor blades each mounted to rotate for pitch change about a pitch change axis in fixed relation to the centre of pressure of the blade but not effectively coincident therewith, an engine drivingly connected to the lifting system, a constant volume variable pressure hydraulic rotor blade pitch control system, means interconnecting the blades and the hydraulic system for transmitting areodynamically produced blade torques, said torques being related to the lift of the rotor blades, an engine driven pumping system including a pump drivingly connected to the engine, and a pressure control means, means connecting the pumping system to the pitch control system for maintaining pressure therein, controls for the engine, means responsive to fluid pressure differences for actuating the engine controls, said means being connected to the pitch control system to be actuated by pressure difference therein corresponding to aerodynamically produced blade torques due to variations in the lift of the rotor blades and to actuate the engine controls to vary the power input to the rotor to correct said variations in lift.

2. A helicopter as claimed in claim 1, and having a hand-operated pitch control, a two-way valve for concerning the pitch control system to either the engine driven pump or the hand operated pitch control, a spring-loaded snap switch tending to move the valve into the emergency position, and a piston in a cylinder supplied with fluid by the pump, to hold the snap switch in the normal position as long as the pump pressure is maintained.

3. A helicopter as claimed in claim 1, and having means for driving the lifting system, a clutch in said driving means, and hydraulic means for engaging or disengaging said clutch, the engine driven pumping system supplying fluid to said hydraulic means, so that the clutch automatically disengages if the pressure drops below a given value.

4. A helicopter having a lifting system, said system including rotor blades each mounted to rotate for pitch change about a pitch change axis in fixed relation to the centre of pressure of the blade but not effectively coincident therewith, an engine drivingly connected to the lifting system, a constant volume variable pressure hydraulic rotor blade pitch control system, means interconnecting the blades and the hydraulic system for transmitting aerodynamically produced blade torques, said torques being related to the lift of the rotor blades, an engine driven pumping system including a pump drivingly connected to the engine, and a pressure control means, a conduit having a restriction therein connecting the pumping system to the pitch control system for maintaining a predetermined pressure therein, controls for the engine, means connected to said conduit on each side of the restriction therein for detecting pressure differences across said restriction corresponding to aerodynamically produced blade torques due to variations in lift of the rotor blades, and means responsive to said detecting means for actuating the engine controls to vary the power input to the rotor to correct said variations in lift.

5. A helicopter having a lifting system, said system including rotor blades each mounted to rotate for pitch change about a pitch change axis in fixed relation to the centre of pressure of the blade but not effectively coincident therewith, an engine drivingly connected to the lifting system, a constant volume variable pressure hydraulic rotor blade pitch control system, means interconnecting the blades and the hydraulic system for transmitting aerodynamically produced blade torques, said torques being related to the lift of the rotor blades, an engine driven pumping system including a pump drivingly connected to the engine, and a pressure control means, a conduit having a restriction therein connecting the pumping system to the pitch control system for maintaining a predetermined pressure therein, controls for the engine, a cylinder having its opposite ends connected to the conduit on opposite sides of the restriction therein, a piston in the cylinder, adapted to be displaced in the cylinder by variations of pressure across the restriction corresponding to aerodynamically produced blade torques due to variations in lift of the rotor blades, and means connecting the piston to the engine controls so as to control the power input to the rotor to correct such variations in lift.

6. A helicopter, having a rotor with a number of blades each mounted to rotate for pitch change about a pitch change axis in fixed relation to the centre of pressure of the blade but not effectively coincident therewith, an engine drivingly connected to the lifting system, a hydraulic pitch control means associated with each rotor blade, a constant volume variable pressure hydraulic pitch control system, to which the pitch control means of individual blades are connected whereby aerodynamically produced blade torques are transmitted to the pitch control system, said torques being related to the lift of the rotor blades, an engine driven pumping system including a pump drivingly connected to the engine, and a pressure control means, a conduit having a restriction therein connecting the pumping system to the pitch control system for maintaining a predetermined pressure therein, controls for the engine, means connected to said conduit on each side of the restriction therein for detecting pressure differences across said restriction corresponding to aerodynamically produced blade torques due to variations in lift of the rotor blades, and means responsive to said detecting means for actuating the engine controls to vary the power input to the rotor to correct said variations in lift.

JOHN SIDNEY NEALE.

REFERENCES CITED

The following references are of record in the file of this patent:

UNITED STATES PATENTS

| Number | Name | Date |
|---|---|---|
| 1,870,928 | Smith | Aug. 8, 1932 |
| 2,122,428 | Larsen | July 5, 1938 |
| 2,262,613 | Larsen | Nov. 11, 1941 |